US011709089B2

(12) United States Patent
Zepp et al.

(10) Patent No.: US 11,709,089 B2
(45) Date of Patent: Jul. 25, 2023

(54) MONITORING WITH A RADIALLY MAGNETIZED MAGNET AND HALL EFFECT SENSOR

(71) Applicant: ACCUTEMP PRODUCTS, INC., Fort Wayne, IN (US)

(72) Inventors: Lawrence P. Zepp, Fort Wayne, IN (US); Gary L. Seitz, Decatur, IN (US)

(73) Assignee: ACCUTEMP PRODUCTS, INC., Fort Wayne, IN (US)

( * ) Notice: Subject to any disclaimer, the term of this patent is extended or adjusted under 35 U.S.C. 154(b) by 0 days.

(21) Appl. No.: 17/208,270

(22) Filed: Mar. 22, 2021

(65) Prior Publication Data

US 2021/0348962 A1 Nov. 11, 2021

Related U.S. Application Data

(63) Continuation of application No. 15/982,770, filed on May 17, 2018, now Pat. No. 10,955,281.

(51) Int. Cl.
  *G01F 23/62* (2006.01)
  *G01D 5/14* (2006.01)
  (Continued)

(52) U.S. Cl.
  CPC ............. *G01F 23/62* (2013.01); *A23L 5/13* (2016.08); *A47J 27/04* (2013.01); *A47J 27/16* (2013.01);
  (Continued)

(58) Field of Classification Search
  None
  See application file for complete search history.

(56) References Cited

U.S. PATENT DOCUMENTS

| 2,736,822 A | 2/1956 | Dunlap, Jr. |
| 2,987,669 A | 6/1961 | Kallmann |

(Continued)

FOREIGN PATENT DOCUMENTS

| AU | 2012284251 A1 | 3/2014 |
| CN | 204493043 U | 7/2015 |

(Continued)

OTHER PUBLICATIONS

AccuTemp Owners Manual for Evolution Steamer, dated Oct. 30, 2009. 21 Pages.

(Continued)

*Primary Examiner* — Lisa M Caputo
*Assistant Examiner* — Nigel H Plumb
(74) *Attorney, Agent, or Firm* — Faegre Drinker Biddle & Reath LLP

(57) ABSTRACT

An improved fluid level sensor includes a radially magnetized magnet integrated into a float, and a Hall sensor adapted to monitor the magnet field emitted from the magnet. This arrangement provides a continuously variable signal across a range of travel, such that a controller receiving the signal can produce precise fluid level measurements and detect operational states of an associated device based on fluid behavior. In addition, the present fluid level sensor is suitable for use in harsh service environments, both because it is physically resilient to fouling, and because the controller is capable of detecting fouling by sensor behavior. In the context of a steam cooker, the present fluid level sensor can also sense low-water, overfill and fouling conditions, while remaining relatively insensitive to food residue, water scale buildup, corrosion and foaming.

19 Claims, 13 Drawing Sheets

(51) Int. Cl.
  *A47J 27/04* (2006.01)
  *A47J 27/16* (2006.01)
  *A23L 5/10* (2016.01)
  *A47J 27/21* (2006.01)

(52) U.S. Cl.
  CPC .......... *A47J 27/2115* (2013.01); *G01D 5/145* (2013.01); *A23V 2002/00* (2013.01); *A47J 2027/043* (2013.01); *A47J 2202/00* (2013.01); *A47J 2203/00* (2013.01)

(56) References Cited

U.S. PATENT DOCUMENTS

| | | | |
|---|---|---|---|
| 3,114,478 A | 12/1963 | Hilkemeier et al. | |
| 3,437,771 A | 4/1969 | Nusbaum | |
| 3,467,135 A | 9/1969 | Muskalla | |
| 4,056,979 A | 11/1977 | Bongort et al. | |
| 4,253,149 A | 2/1981 | Cunningham et al. | |
| 4,459,584 A | 7/1984 | Clarkson | |
| 4,507,976 A | 4/1985 | Banko | |
| 4,589,282 A | 5/1986 | Dumery | |
| 4,646,796 A * | 3/1987 | Krause | B67C 3/22 141/234 |
| 4,730,491 A | 3/1988 | Lew | |
| 4,804,944 A | 2/1989 | Golladay et al. | |
| 4,810,965 A | 3/1989 | Fujiwara et al. | |
| 4,852,404 A | 8/1989 | Catanese | |
| 5,159,268 A | 10/1992 | Wu | |
| 5,294,917 A | 3/1994 | Wilkins | |
| 5,339,699 A | 8/1994 | Carignan | |
| 5,410,913 A | 5/1995 | Blackburn | |
| 5,421,193 A * | 6/1995 | Carlin | G01F 25/22 324/207.13 |
| 5,426,271 A | 6/1995 | Clark et al. | |
| 5,444,369 A | 8/1995 | Luetzow | |
| 5,497,081 A | 3/1996 | Wolf et al. | |
| 5,636,548 A | 6/1997 | Dunn et al. | |
| 5,686,894 A | 11/1997 | Vig et al. | |
| 6,058,926 A | 5/2000 | Ruiz | |
| 6,124,709 A | 9/2000 | Allwine | |
| 6,218,949 B1 | 4/2001 | Issachar | |
| 6,253,611 B1 | 7/2001 | Varga et al. | |
| 6,418,788 B2 | 7/2002 | Articolo | |
| 6,430,380 B2 * | 8/2002 | Kawakami | B41J 2/17566 399/57 |
| 6,453,802 B1 | 9/2002 | Manganiello et al. | |
| 6,510,397 B1 | 1/2003 | Choe | |
| 6,612,404 B2 | 9/2003 | Sweet et al. | |
| 6,670,806 B2 * | 12/2003 | Wendt | F16K 37/0041 137/554 |
| 6,690,159 B2 | 2/2004 | Burreson et al. | |
| 6,810,732 B2 | 11/2004 | Shon | |
| 6,813,946 B1 * | 11/2004 | Benton | G01F 23/74 73/309 |
| 6,923,057 B2 | 8/2005 | Sabatino | |
| 6,992,478 B2 | 1/2006 | Etherington et al. | |
| 7,222,530 B2 | 5/2007 | Fukuhara et al. | |
| 7,343,800 B2 * | 3/2008 | Harman | G01F 23/68 73/322.5 |
| 7,377,162 B2 | 5/2008 | Lazaris | |
| 7,398,682 B2 | 7/2008 | Magers et al. | |
| 7,530,269 B2 | 5/2009 | Newman et al. | |
| 7,581,434 B1 | 9/2009 | Discenzo et al. | |
| 7,725,273 B2 | 5/2010 | Jannotta | |
| 7,856,875 B2 * | 12/2010 | Jeon | A47J 27/04 73/290 R |
| 8,421,448 B1 | 4/2013 | Tran et al. | |
| 9,046,407 B2 | 6/2015 | Young et al. | |
| 9,151,657 B2 | 10/2015 | Ross et al. | |
| 9,297,686 B1 * | 3/2016 | Ross, Jr. | G01F 23/263 |
| 9,335,201 B2 | 5/2016 | Huang et al. | |
| 9,389,295 B2 | 7/2016 | Kurniawan | |
| 9,404,454 B2 | 8/2016 | Achor | |
| 9,423,288 B2 | 8/2016 | Zanetti et al. | |
| 9,423,894 B2 * | 8/2016 | Olsson | G06F 3/0338 |
| 9,464,929 B2 | 10/2016 | Farmanyan | |
| 9,525,309 B2 | 12/2016 | Cummings | |
| 10,209,120 B2 * | 2/2019 | Boecker | G01F 23/546 |
| 2005/0109105 A1 | 5/2005 | Kowalski et al. | |
| 2005/0120793 A1 | 6/2005 | Cochran et al. | |
| 2012/0318252 A1 | 12/2012 | Seitz et al. | |
| 2014/0130874 A1 | 5/2014 | Burlage et al. | |
| 2017/0074715 A1 | 3/2017 | Bartos et al. | |

FOREIGN PATENT DOCUMENTS

| | | |
|---|---|---|
| JP | 07-260552 A | 10/1995 |
| JP | 2002-174544 A | 6/2002 |
| WO | 2006/055006 A1 | 5/2006 |
| WO | 2008/120222 A1 | 10/2008 |
| WO | 2011/101642 A2 | 8/2011 |
| WO | 2017/087896 A1 | 5/2017 |

OTHER PUBLICATIONS

Guide to Selecting the Ideal Pneumatic Cylinder Positioning Application, dated Feb. 26, 2018. 7 pages.
Sensor Choices for Pneumatic Cylinder Positioning, dated Jun. 30, 2016. 15 pages.

* cited by examiner

MONITORING WITH A RADIALLY MAGNETIZED MAGNET AND HALL EFFECT SENSOR

CROSS-REFERENCE TO RELATED APPLICATIONS

This application is a continuation of U.S. patent application Ser. No. 15/982,770, filed May 17, 2018, the entire disclosures of which is hereby expressly incorporated herein by reference.

BACKGROUND

1. Technical Field

The present disclosure relates to precision level sensors, and more particularly, to level sensors which interact with controllers to accurately monitor and/or control system behavior in, e.g., steam heated cooking devices.

2. Description of the Related Art

Sensors are used to monitor the relative amount of a fluid within a fluid reservoir, such as the water level in a steam cooker designed to quickly heat and/or cook food in commercial food service settings. In order to heat and/or cook food in a steam cooker, water is heated until it changes phase to become steam. The steam is then circulated through the cooker using a fan or other circulation mechanism to allow the steam to contact the food and increase the temperature of the food. As the steam is circulated, some may escape the steam cooker such that water from the reservoir is consumed. In order to maintain proper functioning of the steamer and avoid over-temperature conditions, the reservoir must be periodically replenished with fluid.

To this end, some steam cookers use conductance probes to sense water level in a water reservoir typically located at the bottom of the steamer, and may control an electric solenoid valve for the selective addition of water when a "low water" condition is detected by a lack of conductance in the probe. However, such conductance probes ar submersed in a pool of liquid water in the water reservoir below the steam chamber, and are therefore subject to exposure to food particles, grease, and other impurities in the steamer water. In some cases, dirty conductance probes may falsely indicate the presence of water in an empty steamer. Alternately, dirty conductance probes can also falsely indicate the absence of water and cause an overfill condition. Consequently, conductance probes require regular cleaning. Steam cookers may also utilize a magnetic float and reed switch to sense water overfill conditions. Each of these sensors provides a digital on/off signal corresponding to a single discrete water level. The only information that can be inferred from this discrete signal is the presence or absence of water at that level.

Alternative position-sensing technologies are known to be used in other contexts. For example, encoders and servo motors may be used to provide an indication of position of one part relative to another across a range of motion, and are commonly used in robotics applications, for example. While these position-sensing technologies are effective, they can be costly and prone to failure in harsh environments.

Hall effect sensors may also be used to monitor for the presence or absence of a magnet in some motion-sensing applications such as air cylinders. Magnets used with such sensors include axially magnetized magnets, which have poles at respective axial ends along a longitudinal axis of an elongate magnet, and radially magnetized magnets, which have poles at the interior surface of a generally tubular magnet (e.g., a surface facing the longitudinal axis) and the exterior surface (e.g., a surface spaced radially away from the interior surface and facing outwardly away from longitudinal axis). Such Hall effect sensors can be appropriate for harsh environments, e.g., for air cylinders rated for use in such environments, but have typically been used only to provide a digital on/off signal.

It has, however, been noted that a Hall effect sensor can work in conjunction with a radially magnetized magnet to provide an analog output signal over a certain range of travel. As shown in FIG. 1, such a magnet can provide a substantially linear voltage response over a range of about one inch. In this case, the "substantially linear" voltage is illustrated by an R-value in the "substantially linear" portion of the curve that is near one (i.e., 0.9949 as shown).

The present disclosure provides an improved fluid level sensor including a radially magnetized magnet integrated into a float, and a Hall sensor adapted to monitor the magnet field emitted from the magnet. This arrangement provides a continuously variable signal across a range of travel, such that a controller receiving the signal can produce precise fluid level measurements and detect operational states of an associated device based on fluid behavior. In addition, the present fluid level sensor is suitable for use in harsh service environments, both because it is physically resilient to fouling, and because the controller is capable of detecting fouling by sensor behavior. In the context of a steam cooker, the present fluid level sensor can also sense low-water, overfill and fouling conditions, while remaining relatively insensitive to food residue, water scale buildup, corrosion and foaming.

In one form thereof, the present invention provides a level sensing assembly including: a float body that is buoyant on a quantity of fluid; a radially magnetized magnet having an interior bore with a first magnet pole and an exterior surface radially opposite the interior bore, the exterior surface having a second magnet pole opposite the first magnet pole; a Hall effect sensor sized to be translated axially with respect to the radially magnetized magnet along a range of axial travel within the interior bore of the radially magnetized magnet to produce an output, the magnitude of the output varying substantially linearly with respect to a varying axial position of the Hall effect sensor along the range of axial travel; and a controller programmed to receive the output from the Hall effect sensor and determine a level of a fluid corresponding to the axial position of the Hall effect sensor along the range of axial travel.

In another form thereof, the present invention provides a steam cooker including: a cabinet having a cooking chamber accessible through a door, the cabinet substantially sealed when the door is closed; a reservoir in fluid communication with the cooking chamber; and a level sensing assembly. The level sensing assembly includes: a float body buoyant on a quantity of water, the float body positioned within the reservoir, a radially magnetized magnet having an interior bore with a first magnet pole and an exterior surface radially opposite the interior bore, the exterior surface having a second magnet pole opposite the first magnet pole; and a Hall effect sensor sized to be translated axially with respect to the radially magnetized magnet along a range of axial travel within the interior bore of the radially magnetized magnet to produce an output, the magnitude of the output varying substantially linearly with respect to a varying axial position of the Hall effect sensor along the range of axial travel.

In yet another form thereof, the present invention provides a method of assessing the operational state of a fluid-interactive appliance, the method including: receiving an analog signal from a Hall effect sensor disposed within an inner bore of a radially magnetized magnet, the magnitude of the analog signal varying substantially linearly with respect to a varying axial position of the Hall effect sensor along a range of axial travel within the inner bore of the radially magnetized magnet, the radially magnetized magnet fixed to a float that is buoyant on a fluid in a reservoir; processing the analog signal to determine the axial position of the radially magnetized magnet and the float relative to the Hall effect sensor; and determining a level of a fluid within the reservoir from the axial position of the float as a function of the substantially linear analog signal.

BRIEF DESCRIPTION OF THE DRAWINGS

The above-mentioned and other features and advantages of this invention, and the manner of attaining them, will become mom apparent and the invention itself will be better understood by reference to the following description of embodiments of the invention taken in conjunction with the accompanying drawings, wherein.

Figure 1:
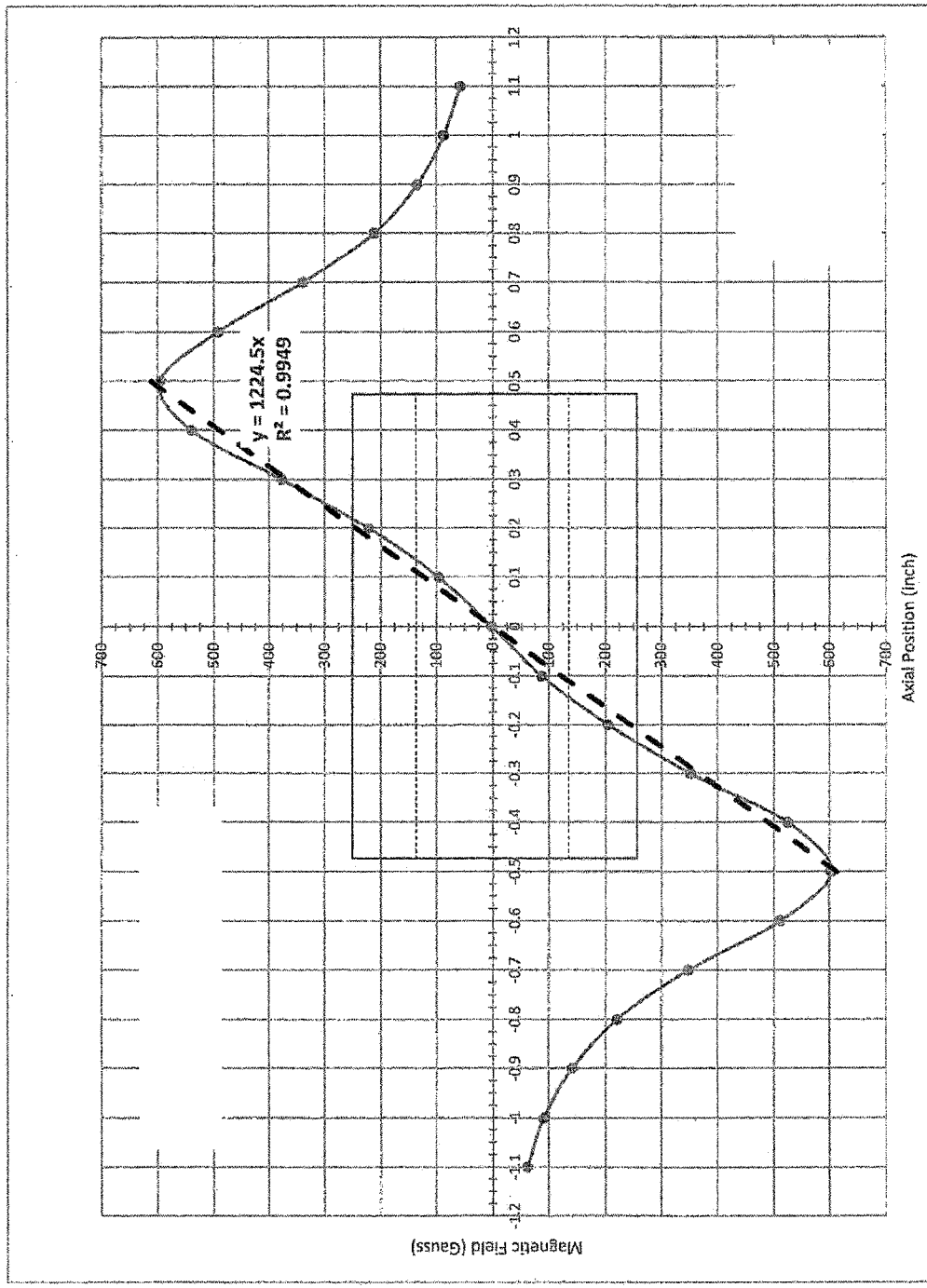
FIG. 1 is a graph showing voltage versus position across an axial range of motion of a radially magnetized magnet being monitored by a Hall effect sensor.

Corresponding reference characters indicate corresponding parts throughout the several views. The exemplifications set out herein illustrates embodiments of the invention, the embodiments disclosed below are not intended to be exhaustive or to be construed as limiting the scope of the invention in any manner.

Commercial and residential food processing devices such as steam cooker 10 shown in FIGS. 6-10 and described further below, often use and consume water from a fluid reservoir. The present disclosure provides level sensing assembly 40 and computing system 100, which can be used to accurately and continuously measure a fluid level within a fluid reservoir, as well as to determine and control operational parameters of the associated device based on the measured behavior of the fluid in the reservoir.

Level sensing assembly 40 may be used in conjunction with any number of different devices, including food processing devices such as coffee makers and other fluid-interactive devices such as humidifiers. For purposes of the present disclosure, level sensing assembly 40 and its associated structures is described in detail herein in the context of steam cooker 10 (FIGS. 6-10), it being understood that the principles of the present design may be similarly applied to other devices as required or desired for a particular application.

Figure 2:
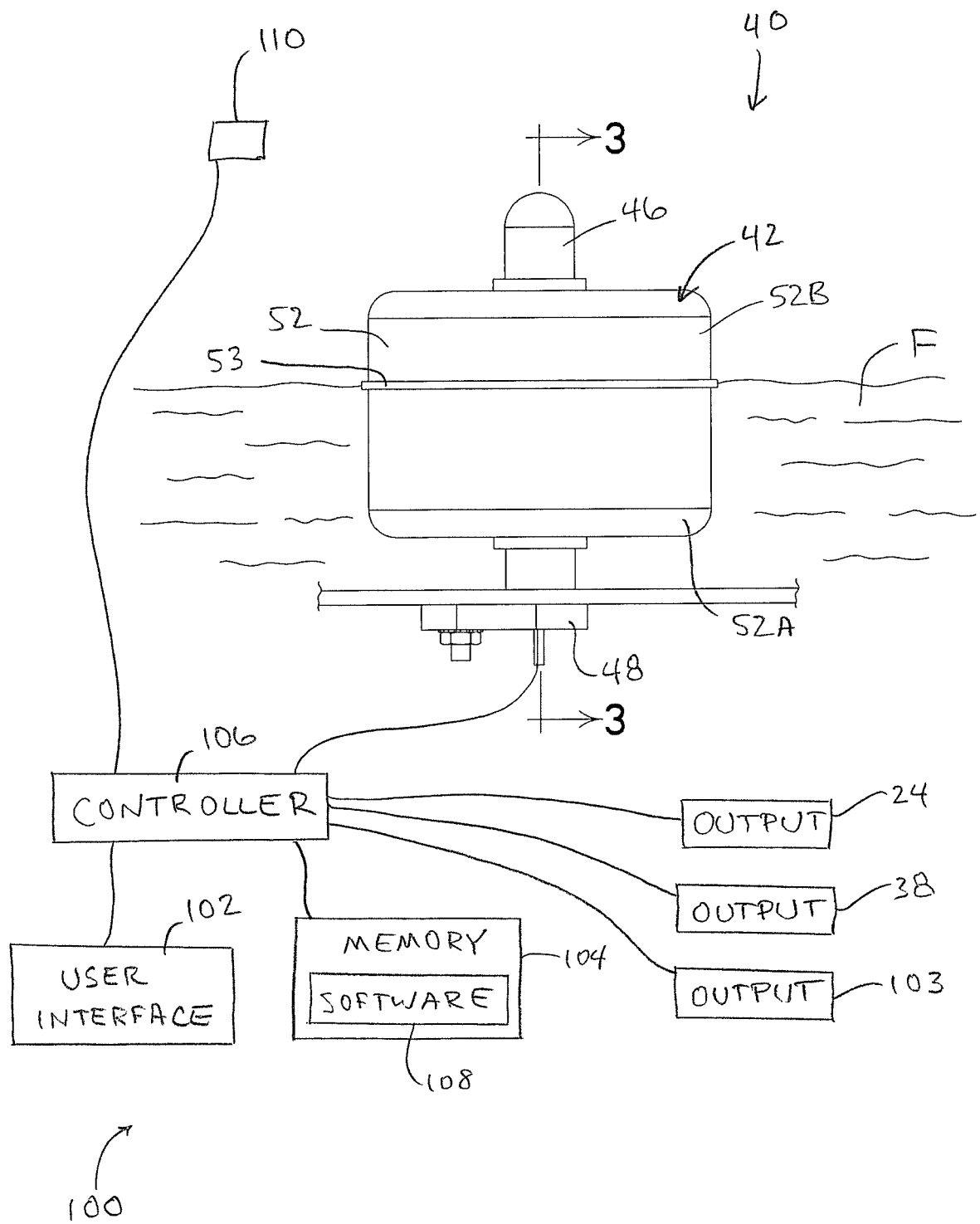
FIG. 2 is an elevation and schematic view of a level sensor assembly made in accordance with the present disclosure, in which the float assembly thereof is partially submerged in a fluid.
Figure 3:
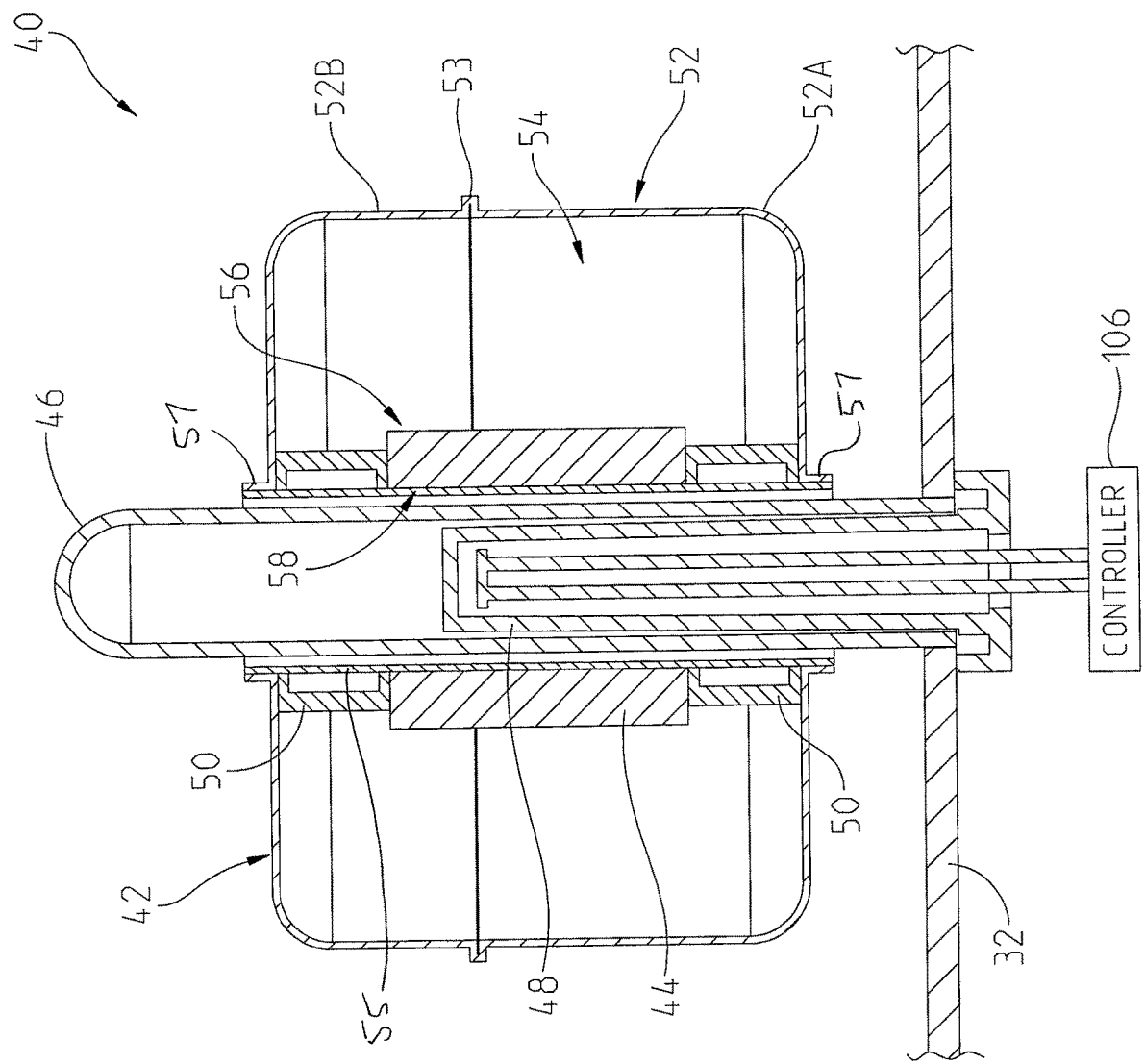
FIG. 3 is an elevation, cross-section view of the level sensor assembly shown in FIG. 2.
Figure 4:
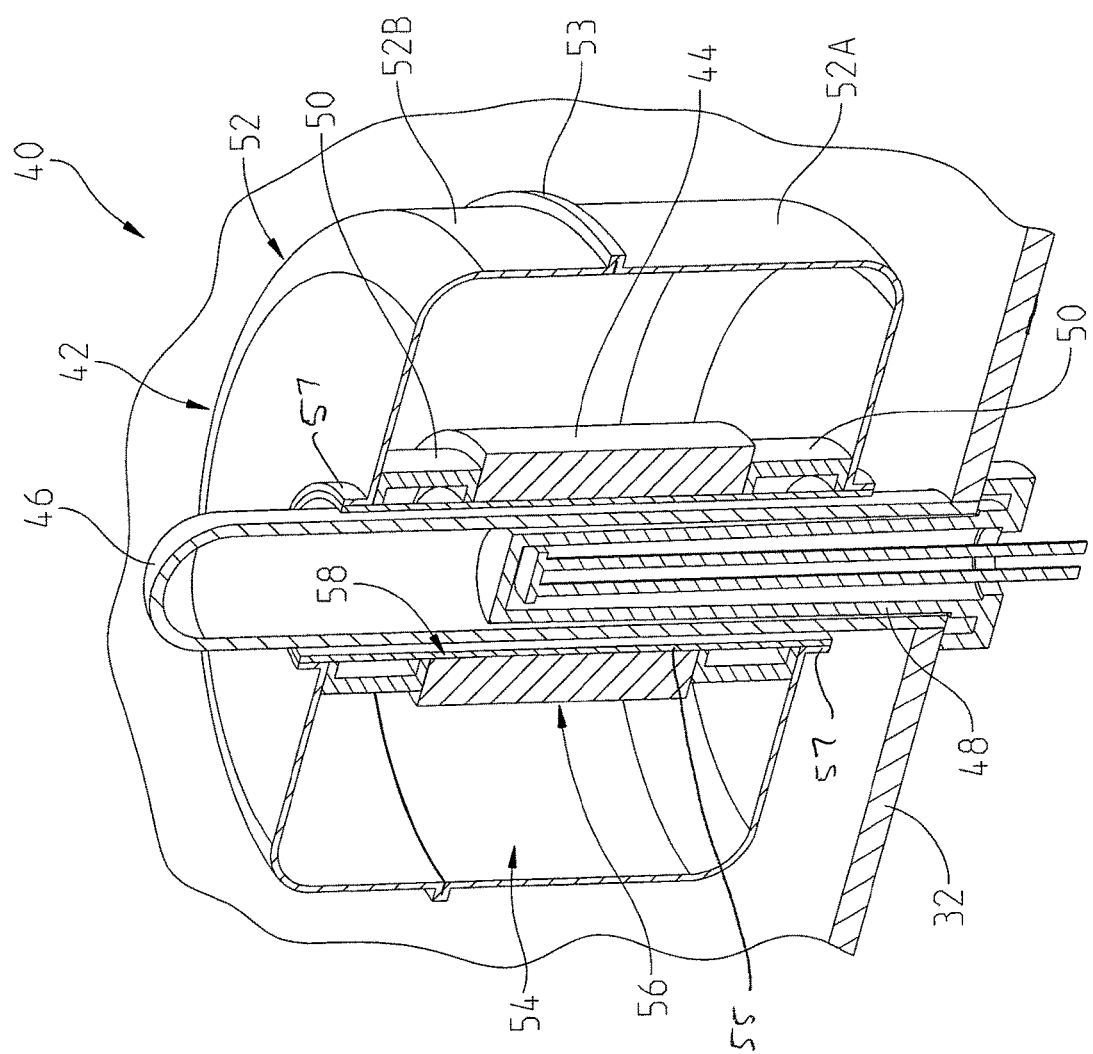
FIG. 4 is a perspective, cross-section view of the level sensor assembly shown in FIG. 2.
Figure 5:
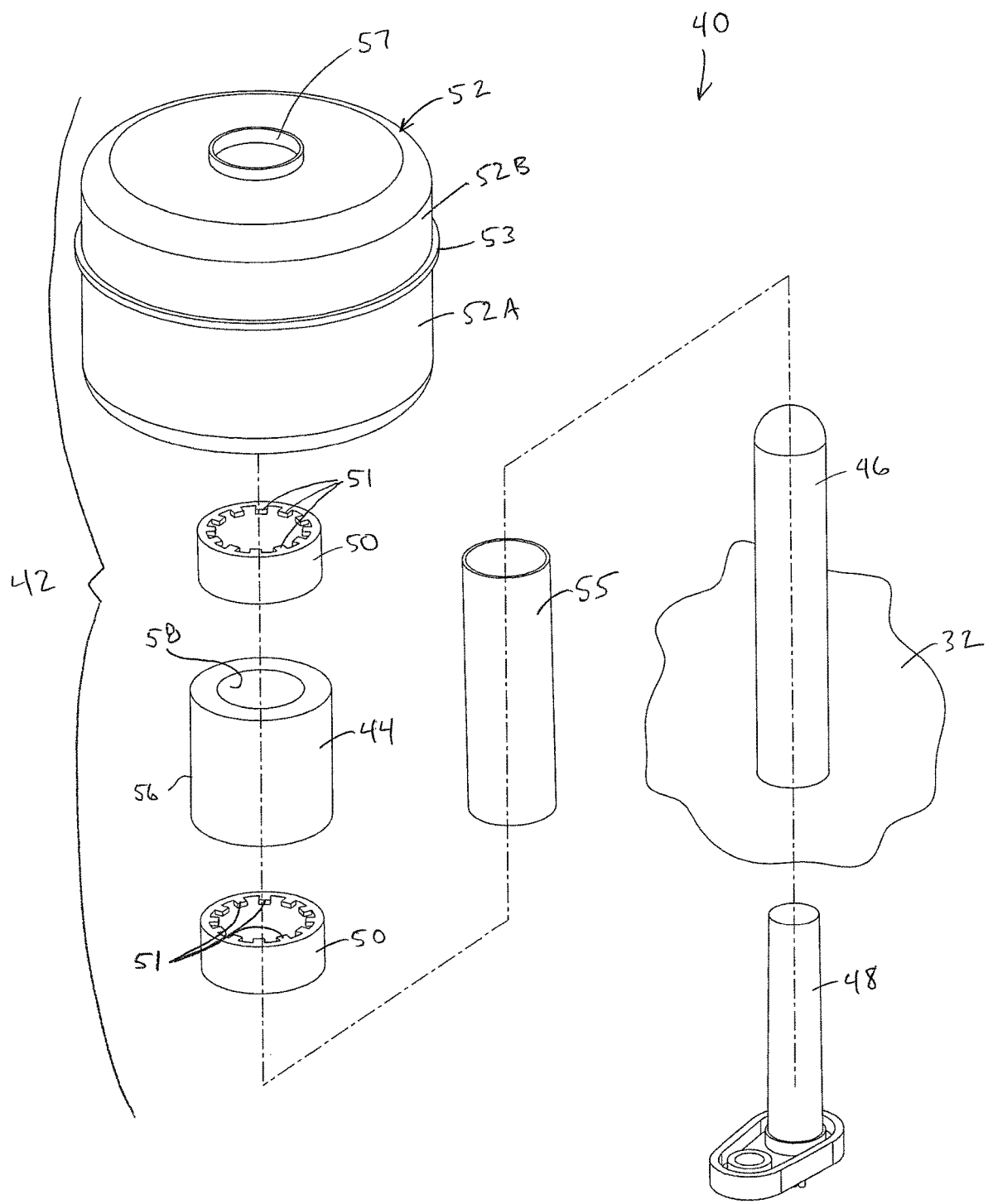
FIG. 5 is an exploded, perspective view of the level sensor assembly shown in FIG. 2.
Figure 6:
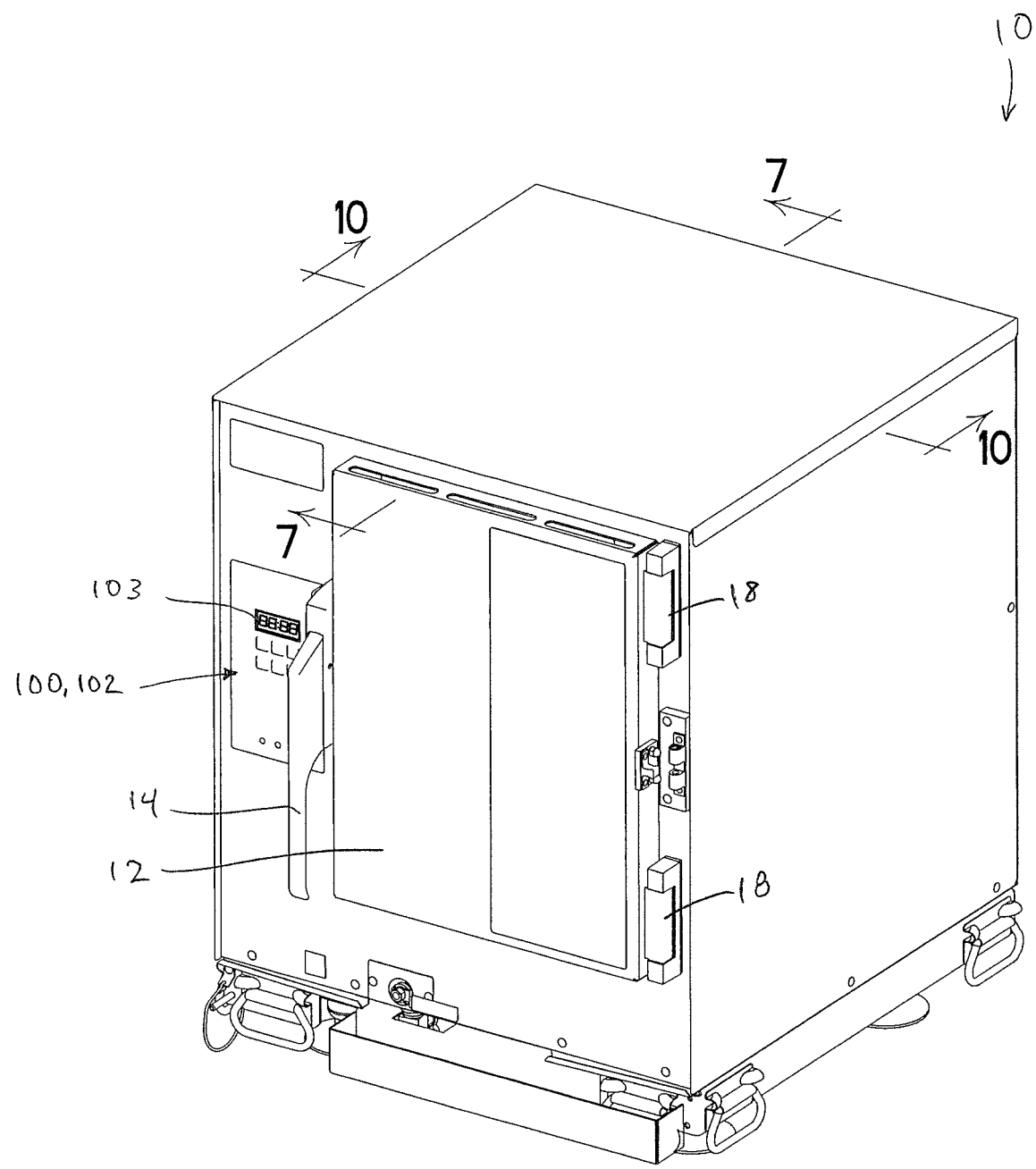
FIG. 6 is a perspective view of a steam cooker made in accordance with the present disclosure.

Turning now to FIGS. 2-5, level assembly 40 is shown attached to a lower wall 32 of a fluid reservoir 26 which may contain a quantity of fluid F (FIG. 2). Float assembly 42 is slidably mounted about an exterior surface of probe 46 such that magnet 44 can move axially up and down along the outer surface of probe 46, which in turn varies the signal produced by Hall effect sensor 48 as described in detail below. Probe 46 is fixed to lower wall 32 and forms a fluid-tight seal therewith, such that fluid F contained in reservoir 26 (FIG. 2) can surround probe 46.

The float body 52 includes a sealed interior volume 54 contained and bounded by lower portion 52A, upper portion 52B, and center tube 55 which forms the cylindrical inner wall of float body 52. The sealed interior volume 54 contains magnet 44, retainers 50 and a volume of air space calculated to provide a desired level of buoyancy in fluid F given the weight of float assembly 42. In the illustrated embodiment of FIGS. 3-5, float assembly 42 is formed by placing retainers 50 and magnet 44 onto the center tube 55 with retainers 50 abutting the upper and lower axial ends of magnet 44 respectively. A lower axial end of center tube 55 is fused (e.g., welded) to protrusion 57 of lower portion 52A of float body 52, while the opposing upper axial end of center tube 55 is fused (e.g., welded) to protrusion of upper portion 52B. At this point, interior volume 54 is enclosed with the retainers 50 and magnet 44 contained therein and supported by center tube 55. Seam 53 between lower and upper portions 52A, 52B may then be formed, e.g., by welding. Thus, center tube 55 cooperates with lower and upper portions 52A, 52B to create a fluid-tight float body and to hermetically seal interior volume 54. In an exemplary embodiment, retainers 50 may be formed from rigid metallic material such as spring steel, stainless steel or beryllium copper. Alternately, a cylindrical spacer may be used to center magnet 44 on center tube 55.

As discussed in further detail below, Hall effect sensor 48 is axially positioned within the hollow bore or cavity of probe 46 at a position to coincide with the axial extent of magnet 44 through its expected range of axial travel. Stated another way, some portion of magnet 44 at all times radially (relative to the longitudinal axis of probe 46) surrounds Hall effect sensor 48 throughout the expected range of axial travel (along the longitudinal axis of probe 46). This allows for the production of an output signal from sensor 48 that is substantially linear throughout the range of axial travel. More particularly, sensor 48 outputs an analog voltage signal, the magnitude of which varies substantially linearly with respect to a varying axial position of magnet 44 relative to sensor 48 along the range of axial travel of magnet 44. For purposes of the present disclosure, "substantially linear" means a signal which defines a linear regression with an R-value at least 0.80. This linear voltage signal provides continuous information to controller 106 (FIG. 2) indicative of the axial position of the float assembly 42 upon probe 46. As detailed below, the position information allows controller 106 to compute the level of fluid F within reservoir 26, as well as to determine the presence, absence and character of various operational states of the larger system, such as whether fluid F is entering or exiting reservoir 26 and the associated rate of ingress or egress, as well as whether fluid F is boiling, whether the radial space between probe 46 and float assembly 42 is fouled or in need of cleaning, and other operational states.

In an exemplary embodiment, retainers 50 are substantially equal in axial size, and/or spaced appropriately along center tube 55, to hold magnet 44 in an axially centered position within interior volume 54 of float body 52. This allows the same linear relationship to exist between the analog voltage curve of sensor 48 and the axial position of float assembly 42 on probe 46, regardless of the orientation of float assembly 42. That is, float assembly 42 may be installed "right side up" with lower portion 52A of float body below upper portion 52B, or "upside down" with portion 52B below portion 52A, with no change in the quality or nature of the signal output generated by the electromagnetic interaction between magnet 44 and sensor 48. Moreover, this interchangeability of orientation of float assembly 42 is also enabled by the radial magnetization of magnet 44, in which a first magnet pole 58 (i.e., one or "north" or "south") is located at the interior bore of magnet 44 (FIG. 3), while a second, opposing magnet pole 56 (i.e., the other of "north" or "south") is located at the exterior surface radially opposite the interior bore. This radial magnetization also prevents polarity reversals associated with axially-opposed magnetic poles (i.e., a magnet with a north pole at one axial and a south pole at the opposing axial end) over a relatively long range of axial travel, e.g., at least one inch. Retainers 50 may also have interior protrusions 51 (FIG. 5) sized to resiliently engage the outer surface of center tube 55, such that retainers 50 and magnet 44 are reliably axially aligned with center tube 55 and the overall longitudinal axis of float body 52.

Magnet 44 may be made as a single, monolithic cylinder or a series of shorter cylindrical magnet components joined or bonded to one another to make a longer cylinder having the desired length. In an exemplary embodiment, retainers 50 are located on center tube 55 between the upper and lower interior walls of float body 52 and magnet 44. For the illustrated application of level sensor 40 in steam cooker 10, magnet 44 may have an outer diameter of 0.787 inches, an inner diameter of 0.531 inches, and an overall axial length of 0.945 inches arising from a stack of six magnet components. For example, each of the six magnet components may have an individual axial length of about 0.158 inches, which combines to create the overall axial length of 0.945 inches for magnet 44. Whether monolithic or component-based, this length and configuration of magnet 44 yields a linear analog signal receivable by Hall effect sensor 48 over one inch of axial travel along probe 46. A larger magnet 44, such as one having an outer diameter of 1.09 inches, an inner diameter of 0.74 inches, and an overall length of 1.31 inches, can be used for a longer effective travel with a substantially linear analog signal of about 1.25 inches.

1. Steam Cooker Application.

As noted above, level sensor assembly 40 may be applied to any fluid reservoir 26 where data pertaining to the level of the fluid, and various changes in such level, is desired. In one exemplary application, fluid reservoir 26 is located within steam cooker 10, shown in FIGS. 6-10, including a computing system 100 (FIGS. 2 and 6) which may receive the signal from level sensor assembly 40 and, after processing, determine water level trends and other information for control over heaters 24 (FIGS. 7 and 8), display 103, and other functions of cooker 10 as detailed below. Computing system 100 may also receive input from temperature sensor 110 (FIG. 7), which provides an analog signal indicative of an ambient temperature within cooking chamber 20.

Steam cooker 10 is includes door 12 mounted to a cabinet, a handle 14 mounted to door 12, and control panel 102. The cabinet of steam cooker is substantially sealed when door 12 is closed, with intentional penetrations for controlled steam and/or pressure release, water ingress for refill, and the like as described in greater detail below. In order to access the interior cooking chamber 20 of steam cooker 10, door 12 may be opened by actuation of handle 14, which allows door 12 to pivot about hinges 18. Wire rails 22 are positioned within cooking chamber 20 of steam cooker 10, as shown in the cross-sectional views of FIGS. 7 and 10, and are configured and positioned to support pans and/or trays of food to be heated and/or cooked.

With food positioned within cooking chamber 20, door 12 may be closed and steam cooker 10 activated, such as by setting a desired temperature and/or by turning on steam cooker 10 via user manipulation of control panel 102. Specifically, when steam cooker 10 is activated, heaters 24 positioned below water reservoir 26 (FIGS. 7 and 8) are activated by controller computing system 100 (FIG. 2), which may be contained within or otherwise operably connected to control panel 102. With heaters 24 activated, the water contained in reservoir 26 is heated and some of the heated water is converted into steam, which is discharged into cooking chamber 20 to heat and/or cook the food contained therein. Heaters 24 may be electric heaters, for example, or may be natural gas and/or liquid propane heaters.

One exemplary steam cooker 10 which can be used with level sensor assembly 40 the Evolution Steamer available from Accutemp Products of Fort Wayne, Ind. One example of an Evolution Steamer is described in a document submitted on even date herewith in an Information Disclosure Statement entitled EVOLUTION STEAMER OWNERS MANUAL, the entire disclosure of which is hereby expressly incorporated herein by reference.

Figure 10:
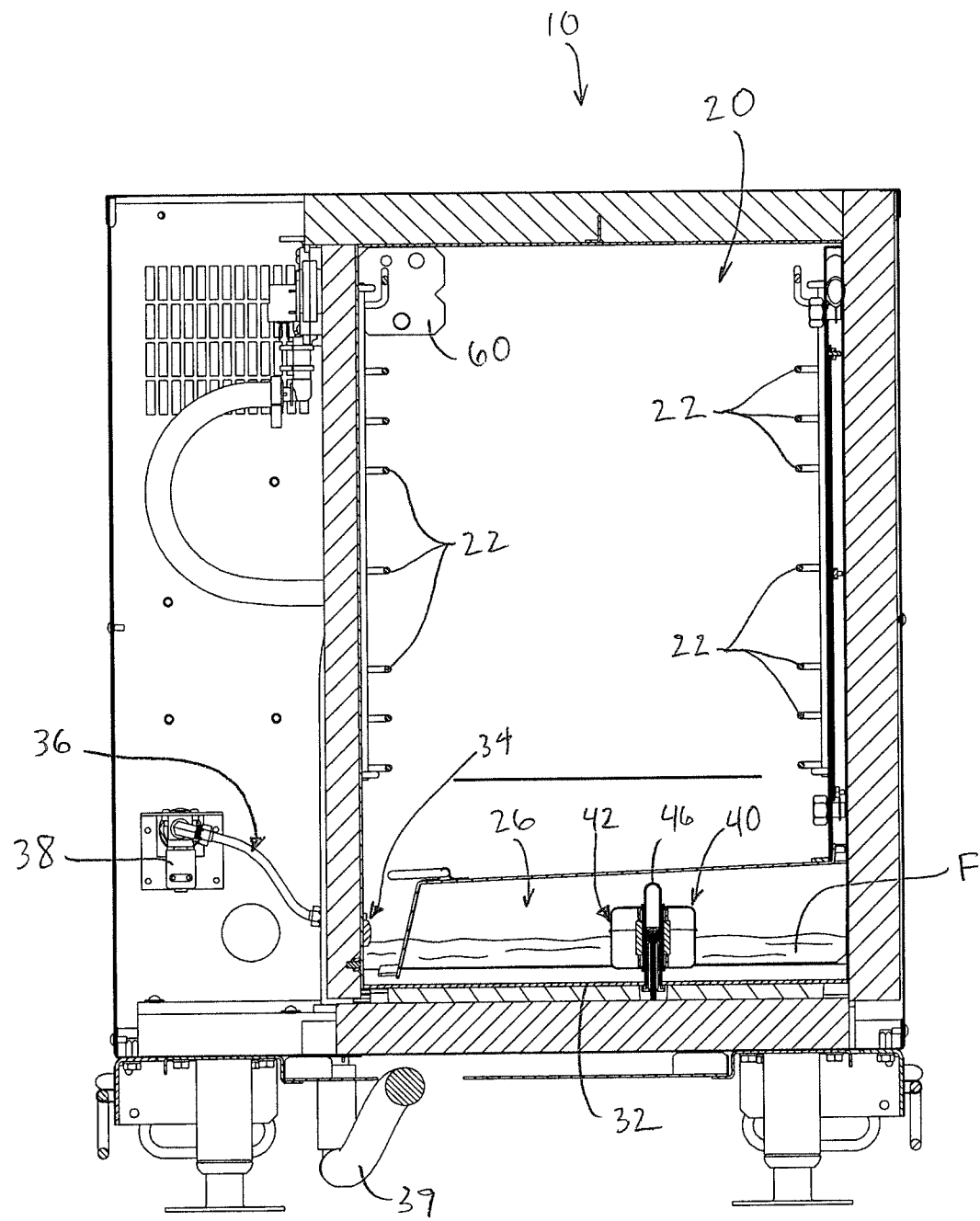
FIG. 10 is an elevation, cross-section view of the steam cooker of FIG. 6, taken along the line 10-10.

In some applications, steam cooker 10 is connected to an external water supply via water port 34 as best seen in FIG. 10. Water port 34 conveys water from the external supply to reservoir 26 via at least one water line 36. The flow of water through water line 36 and into reservoir 26 may be controlled by solenoid valve 38 electrically coupled to computing system 100 (FIG. 2), such that controller 106 may selectively actuate valve 38 to allow the flow of water into reservoir 26, or disallow such flow by deactivation of valve 38. As described in further detail below, controller 106 may activate valve 38 based on the signal received from sensor 48 and associated determinations pertaining to the level and behavior of fluid F within reservoir 26. Alternatively, some steam cooker applications may exclude water port 34, and instead be filled manually by an operator. In these applications, controller 106 may activate a notification, such as "water needed", in lieu of actuation of valve 38.

Figure 8:
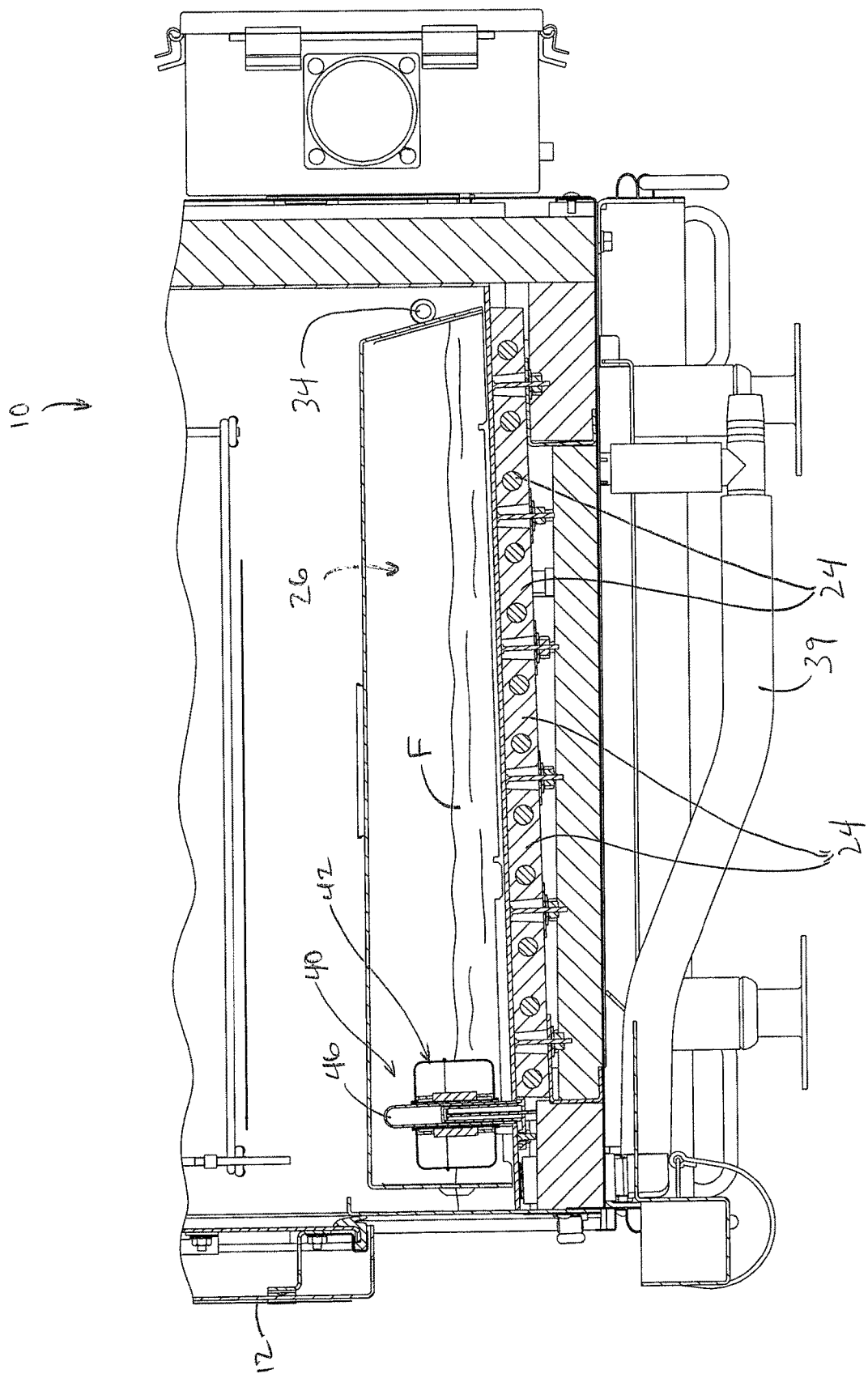
FIG. 8 is an enlarged elevation, cross-section view of a portion of the steam cooker of FIG. 7, illustrating a fluid reservoir thereof.
Figure 9:
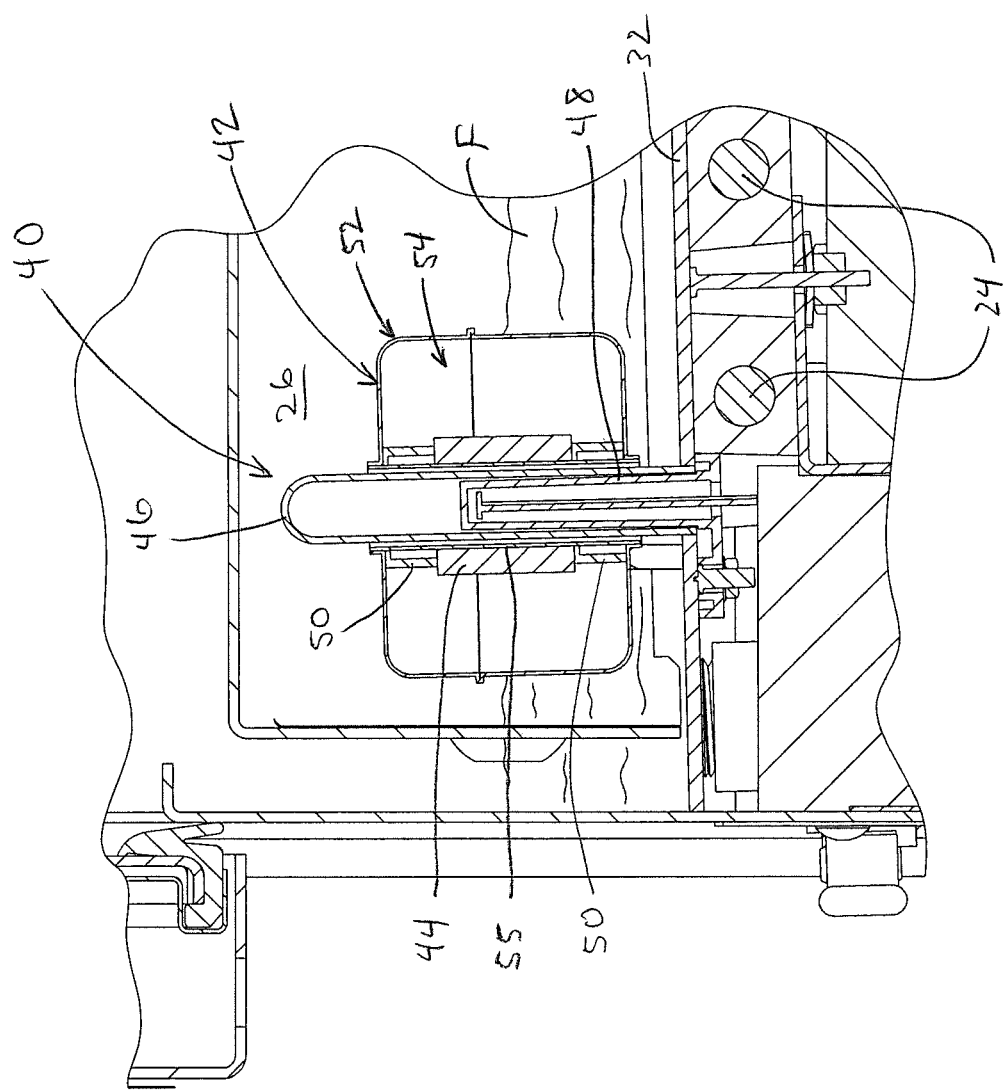
FIG. 9 is an enlarged elevation, cross-section view of a portion of the steam cooker of FIG. 7, illustrating a level sensor assembly made in accordance with the present disclosure.

Referring to FIG. 8, water is stored in reservoir 26, which has a sloped bottom surface with a deepest section near the front of steam cooker 10 (i.e., near door 12). Reservoir 26 includes a closed-ended stainless steel stem welded vertically in this deepest section of reservoir 26. In the illustrated application of steamer 10, this stem serves the function of probe 46, and therefore contains sensor 48 and has float assembly 42 slidably mounted about the exterior surface. Reservoir 26 may include a drain line 39 for selectively evacuating fluid F from reservoir 26, such as for cleaning.

In one exemplary embodiment, the effective maximum depth of water within reservoir 26 of steam cooker 10 may be between 1.5 inches and 2.5 inches, with a 1-inch range of axial travel of float assembly 42 representing the difference between an operationally "empty" reservoir 26 and an operationally "full" reservoir 26. For example, a total water depth between 1.1 inches and 1.4 inches depth may be considered operationally empty, because it corresponds to a water level that is below the minimum for operation of heaters 24. In this exemplary application, float body 52 may be a cylindrical float with a diameter of about 2.5 inches and a height of about 1.9 inches, while magnet 44 contained therein may have a weight of about 43 grams. In this configuration, a water level of about 1.1 inches will cause float assembly 42 to start floating on the surface of fluid F (FIG. 2). Float assembly 42 may then continue axially upwardly along the outer surface of probe 46 until reaching an upper limit corresponding to about 2.5 inches, at which point float body 52 may abut the adjacent lower surface of reservoir 26. In an exemplary embodiment, the inner diameter of magnet 44 (and/or retainers 50) contacts the outside surface of the center tube 55, which in turn forms a complete welded hermetic seal from ingress of fluid F as noted above. The inner diameter of center tube 55 maybe about 0.10 inches larger than the outer diameter of probe 46, in order to provide sufficient clearance for smooth axial travel of float assembly 42. For example, probe 46 may have an outer diameter of 0.50 inches, while the inner diameter of center tube 55 has an inner diameter of about 0.60 inches.

The use of level sensor assembly 40 in conjunction with steam cooker 10 provides high reliability with minimal cleaning requirements, and therefore provides longer and more reliable service intervals as compared to existing designs (e.g., conductivity sensors exposed to fluid F within reservoir 26). In addition, level sensor assembly 40 provides analog signals which can be processed via controller 106 and computing system 100 to precisely determine the level of fluid F, as well the change of such level and trends indicative of operational states of steam cooker 10, as described in further detail below. This enhanced functionality can be used, for example to compensate for variation in local water pressure when undertaking a "fill" operation by directly measuring change in water level from incoming water. Expanded messaging via display 103 of user interface 102 can also assist operators in using, maintaining and assessing the function of steam cooker 10. These enhanced functions can be achieved at reduced cost and complexity, because level sensor assembly 40 may perform the function of several sensors from existing designs such as a high-level sensor, one or more low-level sensors, and conductivity probes.

2. Control System.

Computing system 100, shown in FIG. 2, receives the analog voltage input from Hall effect sensor 48, processes the input to infer operational states and other information about the system utilizing level sensor assembly 40, and can then control outputs directly and/or output messaging to an operator. In the context of steam cooker 10 shown in FIGS. 6-10, computing system 100 can determine water level and associated trends within reservoir 26, boiling conditions of the fluid F, accumulation of contaminants in the vicinity of level sensor assembly 40, leaking water inlet valves, and other conditions as described in detail below.

Referring still to FIG. 2, computing system 100 includes a memory 104 which is accessible by a controller 106. Controller 106 executes software 108 stored on the memory 104. Memory 104 is a computer readable medium and may be a single storage device or may include multiple storage devices, located either locally with computing system 100 or accessible across a network. Computer-readable media may be any available media that may be accessed by controller 106 of computing system 100 and includes both volatile and non-volatile media. In one exemplary embodiment, computing system 100 is a microcontroller or application-specific integrated circuit (ASIC) combining inputs, outputs and memory on a single microchip. In another embodiment, computing system 100 is a programmable logic controller (PLC). In another embodiment, controller 106 is a microprocessor coupled to a separate memory 104.

For other embodiments, such as those in which steam cooker 10 is part of a larger system, computing system 100 may be a general purpose computer or a stand-alone computing device such as a desktop computer, a laptop computer, or a tablet computer. Although computing system 100 is illustrated as a single computing system, it should be understood that multiple computing systems may be used together, such as over a network or other methods of transferring data. Where steam cooker 10 is part of a larger network of systems, software 108 may further include communications software, if computing system 100 has access to a network, such as a local area network, a public switched network (e.g., the Internet), a CAN network, any type of wired network, or any type of wireless network.

Software 108 of memory 104 also includes operating system software. An exemplary operating system software includes commercially available software packages commonly used for industrial microprocessor computers. Where steam cooker 10 is part of a larger network of systems, software 108 may further include communications software, if computing system 100 has access to a network, such as a local area network, a public switched network (e.g., the Internet), a CAN network, any type of wired network, of any type of wireless network.

Referring to FIG. 2, controller 106 of computing system 100 receives inputs from level sensor 40 and/or temperature sensor 110 to assess the operational state of steam cooker 10 (FIGS. 6-10), and can also receive user inputs from user interface 102. Controller 106 then utilizes software 108 stored on memory 104 to generate outputs as required or desired for a particular application, such as to selectively activate or deactivate heaters 24, open or close water valve 38, generate alerts at interface display 103, or other functions related to the operation of steam cooker 10.

Figure 11:
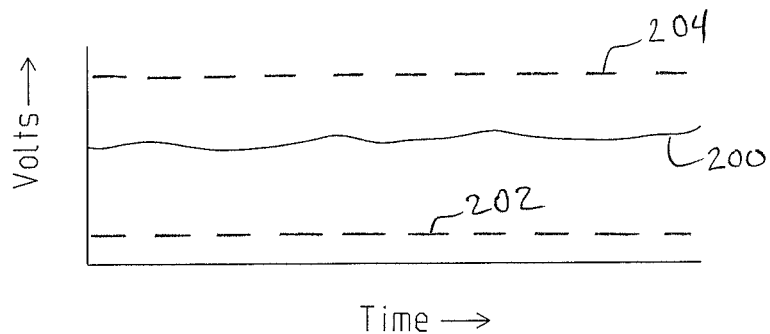
FIG. 11 is a graph showing voltage vs. time for a signal output by a level sensor assembly made in accordance with the present disclosure, in which the signal indicates normal operation.

Turning now to FIG. 11, a graph is shown plotting the voltage output from Hall effect sensor 48 over time, in the manner that such output may be received by computing system 100. In FIG. 11, the voltage signal 200 oscillates semi-randomly within a narrow voltage range, above minimum threshold 202 and below maximum threshold 204. In this operational state, voltage signal 200 is indicating operation of steam cooker 10 within its normal operating range with a level of fluid F above the minimum fluid level (associated with minimum threshold 202) and below the maximum fluid level (associated with maximum threshold 204). In this operational state, steam cooker 10 is ready for operation and may be placed into operation by a user command at user interface 102, such as by placing the steam cooker 10 into "COOK" mode. Upon receipt of such a command, controller 106 activates heaters 24.

If voltage signal 200 exceeds maximum threshold 204, computing system 100 may determine that fluid F contained in reservoir 26 is above its maximum fill level. In this operational state, controller 106 may be programmed to disable heaters 24, close water valve 38 in order to prevent any further ingress of water into reservoir 26, illuminate a high water light or other signal at display 103, and/or activate an alarm. This operational state indicates an "overfill shutdown" condition, which may be remedied by manual or automatic removal of sufficient fluid F from reservoir 26. In one exemplary embodiment, the maximum threshold is about 3.6 V. For purposes of the present disclosure, all voltages refer to a nominal DC voltage.

Similarly, if voltage signal 200 falls below minimum threshold 202, computing system 100 may determine that fluid F contained in reservoir 26 is below its minimum fill level. In this operational state, controller 106 may be programmed to take one or more corrective actions, such as disabling heaters 24, opening water valve 38 in order to allow water to flow into reservoir, illuminating a low water light or other signal at display 103, and/or activating an alarm. In one exemplary embodiment, the maximum threshold is about 2.2V.

Where a fill operation is undertaken, a low-amplitude or substantially linear voltage signal similar to signal 200 is produced, except the signal has an upward-sloping line to indicate that the level of fluid F is rising as water is added to reservoir 26. In an exemplary fill operation, for example controller 106 may open water valve 38 to raise the level of fluid F—and therefore, the nominal voltage of signal 200- to a designated or pre-determined nominal value. This obviates the need for predetermined valve-open times associated with known controllers, thereby resulting in a highly accurate fill procedure even despite variation in inlet water pressure and the associated rate of incoming water through valve 38. Thus, for example, the use of level sensor assembly 40 with computing system 100 prevents an overfill shutdown condition which might otherwise result when a time-delay fill operation is undertaken with high water pressure at water valve 38.

Figure 12:
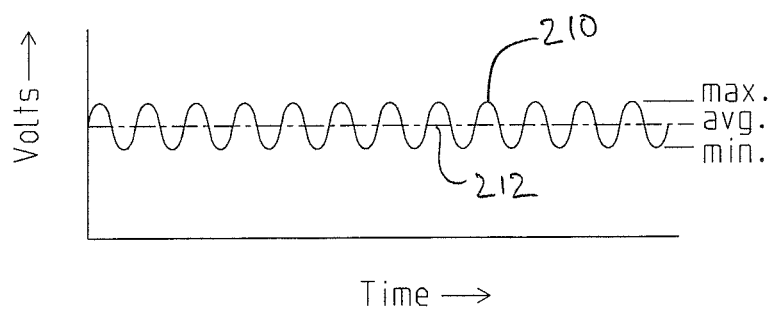
FIG. 12 is a graph showing voltage vs. time for a signal output by a level sensor assembly made in accordance with the present disclosure, in which the signal indicates boiling operation.

The steady and low-amplitude signal variation shown in voltage signal 200 of FIG. 11, which is a substantially linear signal, indicates a non-boiling, baseline operational state of steam cooker 10. Conversely, the oscillating signal 210 shown in FIG. 12 is indicative of a boiling operational state is shown. In particular, boiling water within reservoir is indicated by large, regular amplitude between maximum and minimum voltages across a relatively short time frame, such as a time interval between 0.1 seconds and 0.5 second such as 0.35 seconds. This oscillation of signal 210 indicates that float assembly 42 is bouncing on the turbulent boiling fluid F within reservoir 26, such that the observed water "depth" appears to be oscillating to result in the observed voltage oscillation. The nominal amplitude or frequency of signal 210 may vary depending on the power of heaters 24, with a larger power output from heaters 24 corresponding to a larger nominal variation due to a more rigorous boil. In some applications, the amplitude of signal 200 may be +/−0.05 V to +/−0.15 V with reference to the nominal average level 212. In addition, the average level 212 of signal 210, which is computed by software 108 of computing system 100 over a designated time interval such as between 2 and 4 seconds, may be nominally lower than the corresponding average level of signal 200 due to the reduced density of boiling water as compared to non-boiling water, and the associated reduction in buoyancy of float assembly 42. Therefore, computing system 100 may monitor for a drop of between 0.3 V and 0.5 V in average level 212 of signal 210 as compared to a recent non-boiling signal 200 in order to detect and/or validate a boiling condition.

Where a boiling condition is detected by computing system 100, controller 106 may issue a "boiling" signal to display 103 and/or initiate a timer for timed cooking operations, such that the timer may compare the elapsed boiling time to a user-set or otherwise predetermined cooking time. When the elapsed boiling time reaches the predetermined cooking time, controller 106 may deactivate heaters 24 and issue a "cook time complete" or similar signal.

In some operations of steam cooker 10, steam may be vented from cooking chamber 20 (FIG. 7), e.g., in order to induce increased circulation of steam around the food items contained therein. Steam cooker 10 may include a variable steam vent 60, shown in FIG. 10, which can be toggled to vent steam to the surrounding environment at an operator-selected rate. Additional details of steam vent 60 and other exemplary steam venting designs can be found in U.S. Patent Application Publication No. 2012/0318252, published Dec. 20, 2012 and entitled VARIABLE SPEED STEAM COOKER, the entire disclosure of which is hereby expressly incorporated herein by reference.

Figure 13:
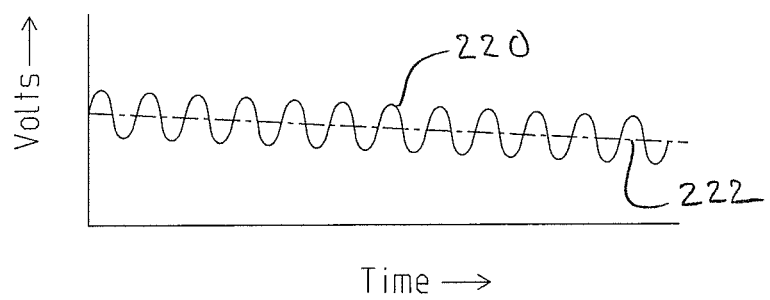
FIG. 13 is a graph showing voltage vs. time for a signal output by a level sensor assembly made in accordance with the present disclosure, in which the signal indicates boiling operation over a longer time span as compared to the signal of FIG. 12, with water usage caused by steam venting.

Turning now to FIG. 13, computing system 100 may detect the rate of water loss during a boiling operational state by monitoring for signal 220. As illustrated, signal 220 has the same overall amplitude between short-term minimum and maximum voltages, but the average level 222 of signal 220 exhibits a steady downtrend in voltage over time. The slope of the downtrend is dependent on several factors including the rate of steam venting, the amount of fluid F contained in reservoir 26 and the power output from heaters 24. In general, where computing system 100 detects a downward slope exceeding between 0.01 V per minute and 0.05 V per minute, controller 106 may output a "steam venting" or similar signal indicative of this operational state.

Figure 7:
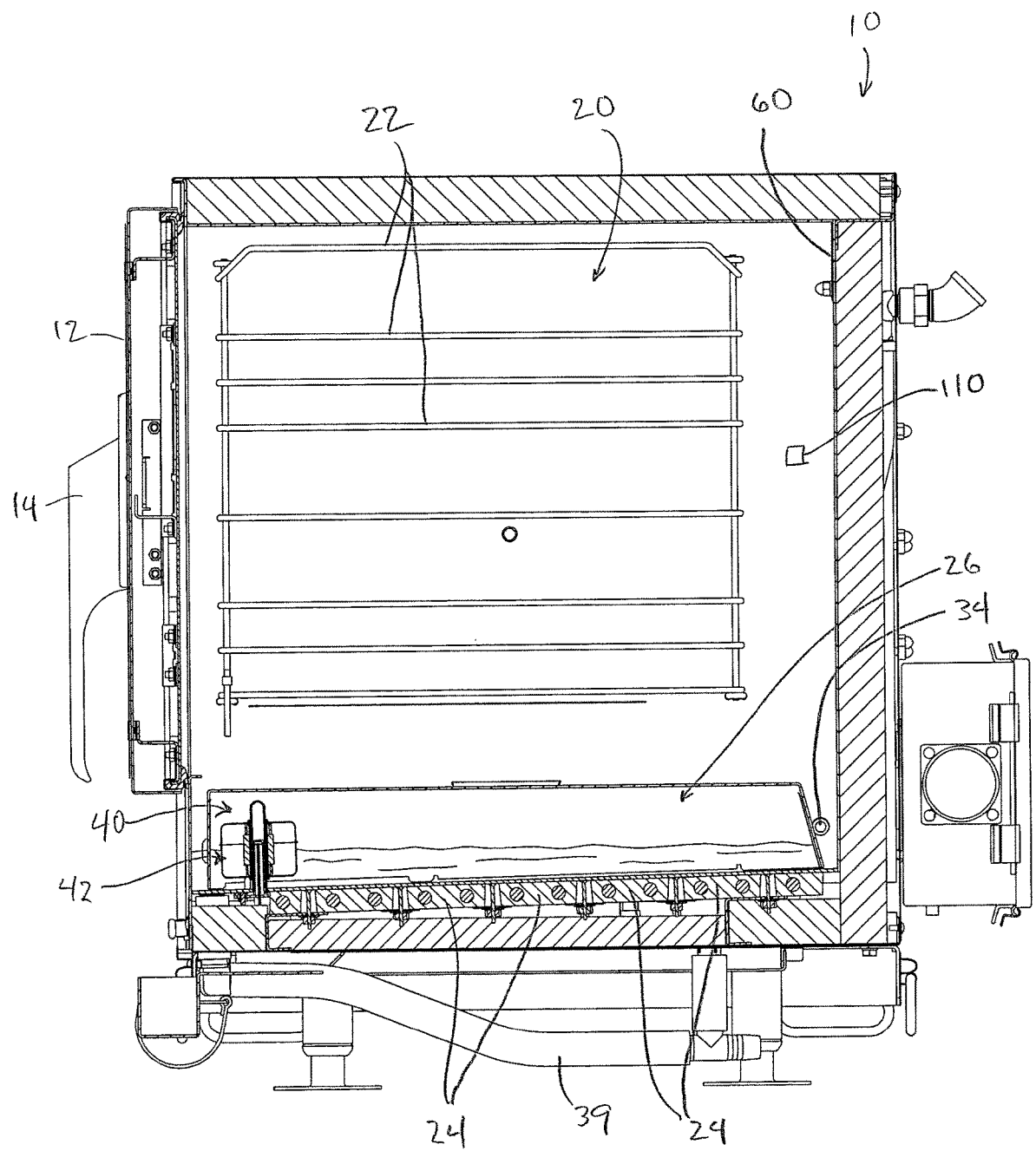
FIG. 7 is an elevation, cross-section view of the steam cooker of FIG. 6, taken along the line 7-7.
Figure 14:
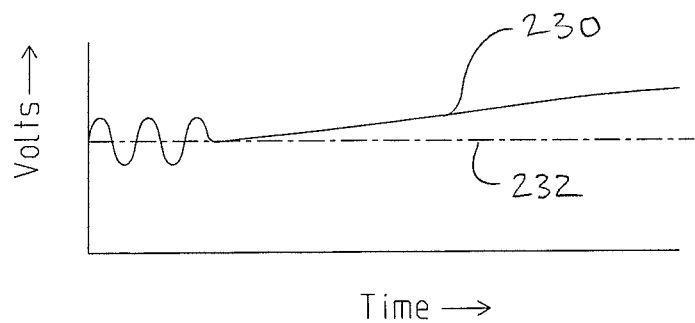
FIG. 14 is a graph showing voltage vs. time for a signal output by a level sensor assembly made in accordance with the present disclosure, in which the signal indicates boiling operation followed by a fill operation.

Turning now to FIG. 14, signal 230 indicative of a fill operation during a boiling operational state is shown. In some boiling operations, such as a "steam venting" operation described above with respect to FIG. 13, the level of fluid F in reservoir 26 may drop to (or near) lower limit 202 (FIG. 11) as the fluid level depletes. In such a state, controller 106 may be programmed to automatically introduce water to reservoir via water valve 38 (FIGS. 7 and 8). Computing system 100 may verify the addition of water called for by controller 106 by monitoring for signal 230. In particular, when water valve 38 is activated to allow water flow through water line 36 as described above, the signal amplitude decreases as the cold incoming water interrupts the boiling of water in reservoir 26. Simultaneously, the nominal voltage of curve 230 ascends from the immediately preceding average level 232, indicating an increase in the nominal level of fluid F within reservoir 26. As described above, controller 106 may close water valve 38 upon reaching a predetermined voltage at or below maximum level 204 (FIG. 11).

In addition to the normal operational states detailed above, computing system 100 and controller 106 may be programmed to detect and react to operational states indicative or improper operation or the need for operator intervention. As detailed below, these states may include fouling or otherwise dirty conditions in the vicinity of level sensor 40, leaking water from reservoir 26, a malfunctioning or leaking water valve 38, and other conditions.

Figure 15A:
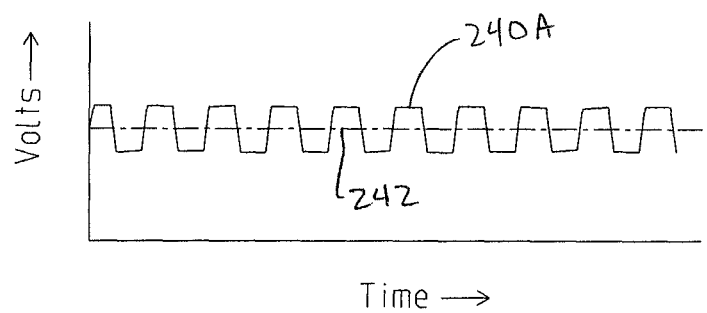
FIG. 15A is a graph showing voltage vs. time for a signal output by a level sensor assembly made in accordance with the present disclosure, in which the signal approximates a square wave form which indicates a sticking float in a boiling operation.
Figure 15B:
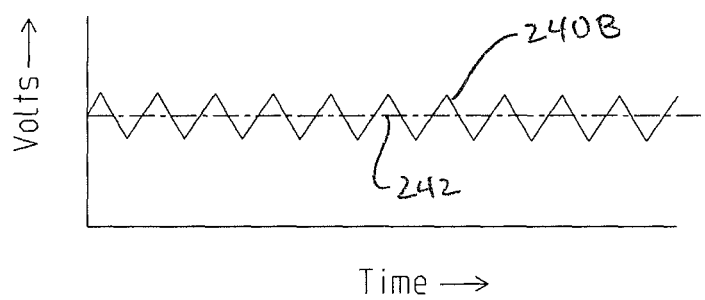
FIG. 15B is a graph showing voltage vs. time for a signal output by a level sensor assembly made in accordance with the present disclosure, in which the signal approximates a triangular wave form which indicates a sticking float in a boiling operation.
Figure 15C:
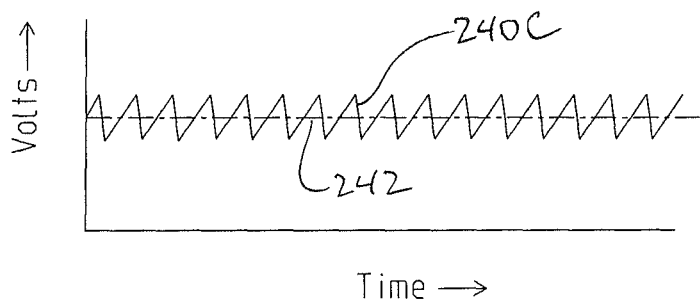
FIG. 15C is a graph showing voltage vs. time for a signal output by a level sensor assembly made in accordance with the present disclosure, in which the signal approximates a "saw tooth" wave form which indicates a sticking float in a boiling operation.

Turning to FIG. 15A-15C, signals 240A, 240B and 240C are respectively indicative of hindered movement of float assembly 42 on probe 46 during a boiling operational state. In FIG. 15A, the shape of signal 240A approximates a square wave, rather than the sine wave shape of signal 210. This squared appearance of signal 240A indicates that float assembly 42 must overcome a high level of static friction before moving axially along probe 46. Computing system 100 may monitor the rate of change of voltage. Where the rate of change is above a threshold level, undue "steepness" of signal 240A is determined and computing system thereby detects a sticking float. Controller 106 may then output a message to display 103 of "float sticking, clean float" or a similar corrective message, and/or set an alarm or take other corrective action. In one embodiment, for example, a rate of change exceeding 1 V/second, may be a threshold for computing system 100 to determine a "float sticking" operational fault. Alternatively, the measured rate of change may be at least 25% faster than the maximum rate of change observed in the "baseline" operation depicted in FIG. 11 and described above.

Similarly, FIG. 15B shows a triangular wave form 240B which, with its sharp transitions between generally linear up- and down-slope portions, suggests a rough or "jerky" type of movement distinct from the smooth movement suggested by the wave-shaped signal 210. FIG. 15C shows a "saw tooth" type pattern in which the up-slope portion is similar to the triangular wave form of FIG. 15B, but the downslope portion is similar to the square wave form of FIG. 15A. This can also indicate high levels of static and/or dynamic friction between probe 46 and float assembly 42. Similar to the discussion of signal 240A above, computing system 100 can monitor for the sharp inflections and/or unusual slope characteristics depicted in FIGS. 15B and 15C to determine that float assembly 42 is sticking.

In addition, reduced float amplitude during boiling may indicate float assembly 42 is starting to bind or stick on probe 46. If the amplitude of signal 240 is with respect to average level 242 is reduced by a threshold amount from a designated normal amplitude while temperature sensor 110 indicates a temperature of at least 210 F, computing system 100 may determine a "float sticking" operational fault with the same corrective actions as noted above. In an exemplary embodiment, a reduction of amplitude of at least 20% from a normal boiling amplitude (as discussed above) may meet the threshold for a "float sticking" operational fault.

Alternatively, computing system 100 may be programmed to determine that float assembly 42 is completely stuck in some operational states. For example, when water valve 38 is activated by controller 106, if computing system 100 does not detect an increase in voltage output by sensor 48 for at least a predetermined time (e.g., between 3 and 5 seconds), then computing system 100 may determine that either float assembly 42 is stuck in position on probe 46, or that water is not in fact flowing into reservoir 26. In this case, controller 106 may output a corrective message of "stuck float or water off" or similar, and/or set an alarm or take other corrective action. If temperature sensor 110 detects a temperature within cooking chamber 20 of at least 210 F for a duration of at least 3 minutes, but the voltage level and voltage amplitude remain unchanged over this time interval, then computing system may determine that float assembly 42 is stuck in place on probe 46. For purposes of the present disclosure, the amplitude may be considered "unchanged" if the amplitude does not reach a minimum threshold of +/−0.05 V with reference to the average voltage signal. Controller 106 may then output a corrective message of" stuck float, clean float" or similar, and/or set an alarm or take other corrective action. Similarly, if temperature sensor 110 detects a temperature within cooking chamber 20 of at least 210 F and the voltage is within an operating range between 2.2 V and 3.6 V, but an over-temperature fault occurs indicative of heaters 24 running in a dry reservoir 26, then computing system may determine that float assembly 42 is stuck in place on probe 46 and controller 106 may output a corrective message of" stuck float, clean float" or similar, and/or set an alarm or take other corrective action.

Figure 16:
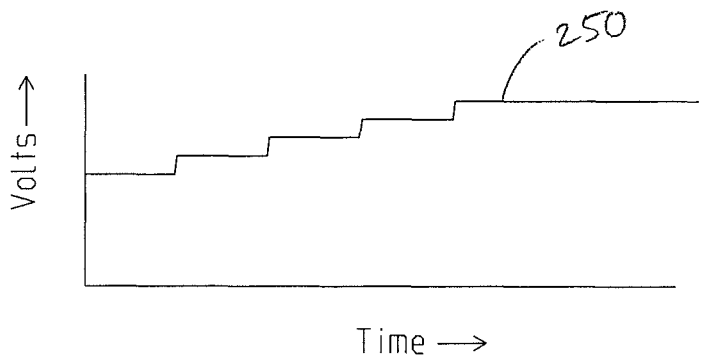
FIG. 16 is a graph showing voltage vs. time for a signal output by a level sensor assembly made in accordance with the present disclosure, in which the signal indicates a sticking float in a fill operation.

FIG. 16 illustrates another signal 250 indicative of hindered movement of float assembly 42 on probe 46 during a fill operation is shown. Similar to signal 240, signal 250 intermittently illustrates no change in voltage and a fast rate of voltage change (e.g., exceeding 1 V/second) output by sensor 48 during a fill operation, i.e., when water valve 38 is open or water is otherwise known by computing system 100 to be flowing into reservoir 26. The intermittency of these opposite signals, or the rate of change alone, may be used by computing system 100 to determine that float is overcoming high static friction during the fill operation. Similar to the discussion above with respect to signal 240, these conditions may cause controller 106 to output a corrective message to display 103 of "float sticking, clean float" or similar, and/or set an alarm or take other corrective action.

Figure 17:
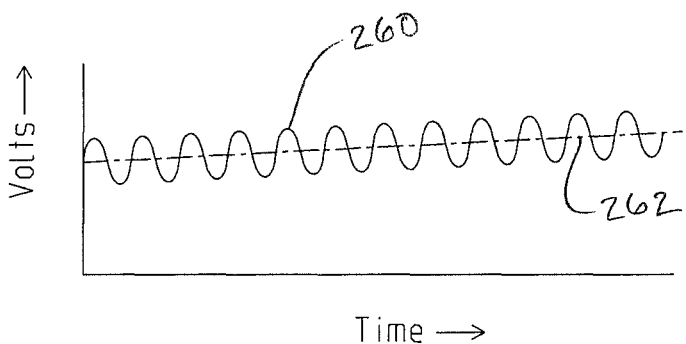
FIG. 17 is a graph showing voltage vs. time for a signal output by a level sensor assembly made in accordance with the present disclosure, in which the signal indicates a leaking water valve during a boiling operation.

FIG. 17 illustrates another fault signal 260 indicative of a leaking water valve 38. In particular, if controller 106 has directed that water valve 38 is off (i.e., no water should flow to reservoir 26), but the average voltage level 262 slowly increases over a period of time, such as between 8 and 12 seconds, then computing system 100 determines that water valve 38 is leaking (i.e., admitting water when to reservoir 26 in the off position). In one exemplary embodiment, for example, an increase in voltage of at least 0.3 V over the 10-second period results in such a determination. In this case, controller 106 outputs a corrective message of "water valve leaking" or similar to display 103, and/or set an alarm or take other corrective action. This slow increase in voltage with water valve 38 nominally off may occur during a boiling operation, as shown in signal 260 shown in FIG. 17, or during a non-boiling operation similar to signal 200 shown above but with an unexpected upward slope.

Computing system 100 may also monitor the nominal voltage received from sensor 48 over time and make determinations about the state of sensor 48 and/or the larger computing system 100. For example, if the voltage output from sensor 48 is between 0.0 V and 0.2 VDC for at least 10 seconds, then computing system 100 may determine that no power is being provided to sensor 48. Controller 106 may then output a fault message of "level sensor —no power" or similar to display 103, and/or set an alarm or take other corrective action. If the voltage output from sensor 48 is between 4.8 V and 5.2 V for at least 10 seconds then computing system 100 may determine that sensor 48 has been shorted. Controller 106 may then output a fault message of "level sensor—shorted power" or similar to display 103, and/or set an alarm or take other corrective action. If the voltage output from sensor 48 is about 2.6 V for at least 10 seconds with minimal variation (e.g., within 0.2 V), then computing system 100 may determine that magnet 44 is absent from the vicinity of sensor 48, because some natural voltage variation is expected from sensor 48 when float assembly 42 is mounted on probe 46 as shown in operational signal 200 of FIG. 11. In this instance, controller 106 may then output a fault message of "check float" or similar to display 103, and/or set an alarm or take other corrective action.

Computing system 100 may also be programmed to operate controller 106 in a "marine mode," in which a special set of operating parameters is designed to account for the natural rocking motion encountered by a steam cooker 10 positioned on a ship at sea. Detection of the presence of steam cooker 10 aboard a ship at sea is accomplished by computing system 100 observing a wave-shaped signal 270, shown in FIG. 18, with a wide amplitude of at least 0.5 V total deviation from average level 272 over a period of about 15 seconds. When signal 270 is detected, computing system 100 enable the marine mode. At this point, controller 106 may illuminate an icon or other feature on display 103 to indicate the marine mode operational state. Computing system will average signals received from sensor 48 over a 20-second time window, rather than operating on the basis of continuous signal processing as described above with respect to non-marine mode monitoring.

In addition, an overfill operational state (described above with respect to maximum threshold 204 of signal 200) will not activate until signal 200 continuously exceeds threshold 204 for a threshold time, such as between 8 and 12 second, such as 10 seconds.

Further, for a water fill operation in marine mode, controller 106 opens water valve 38 for a "fill" period of 4 seconds followed by a 10 second delay. If the desired level of fluid F has not been achieved after the delay, another 4 second fill and 10 second delay is initiated. This process repeats until the desired level of fluid F is maintained for the entire 10 second delay period.

Figure 18:
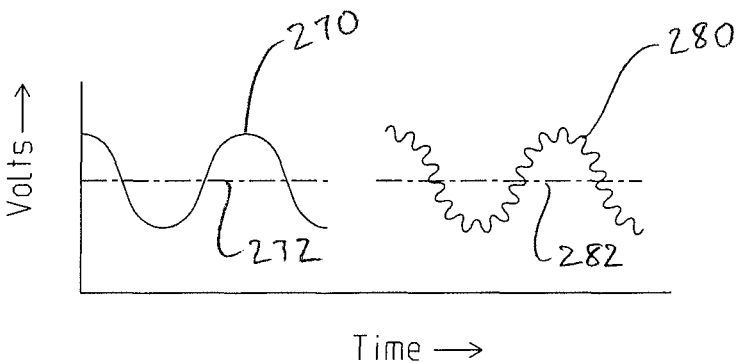
FIG. 18 is a pair of graphs showing voltage vs. time for a signal output by a level sensor assembly made in accordance with the present disclosure, in which the respective signals indicate normal operation and a boiling operation on a ship at sea.

FIG. 18 also shows a signal 280 indicative of boiling operation in marine mode. As illustrated, signal 280 retains the larger amplitude of signal 270, but as a secondary amplitude within the larger sine wave that illustrates the "bouncing" of float assembly 42 on fluid F as described above with respect to the boiling signal 210 of FIG. 12. That is, the boiling signal 210 is superimposed on marine mode signal 270 during a boiling operation aboard a ship at sea.

If the amplitude of signal 270 falls to 0.4 V or less throughout a 15 second time window, then marine mode may be disabled by computing system 100. This results in a resumption of regular operating parameters, including the ceasing of signal averaging, resuming normal fill operations, and turning off the marine mode signal on display 103.

Thus, as described in detail above, computing system 100 can receive the analog voltage output from the Hall effect sensor 48 and determine a level of fluid F contained in reservoir 26 from the corresponding axial position of the Hall effect sensor 48 along its range of axial travel along probe 46. Software 108 can further interpret such analog level signals for expanded capability and diagnostics, including predictive diagnostics that can predict a failure before it occurs. In particular, the waveform and timing of the analog level signal can be interpreted by controller 106 and software 108 to provide automatic capabilities.

While this invention has been described as having exemplary designs, the present invention may be further modified with the spirit and scope of this disclosure. Further, this application is intended to cover such departures from the present disclosure as come within known or customary practice in the art to which this invention pertains.

What is claimed is:

1. A level sensing assembly comprising:
   a float body that is buoyant on a quantity of fluid;
   a radially magnetized magnet having an interior bore with a first magnet pole and an exterior surface radially opposite the interior bore, the exterior surface having a second magnet pole opposite the first magnet pole;
   a Hall effect sensor sized to be translated axially with respect to the radially magnetized magnet along a range of axial travel within the interior bore of the radially magnetized magnet to produce an output, the magnitude of the output varying substantially linearly with respect to a varying axial position of the Hall effect sensor along the range of axial travel;
   a controller programmed to receive the output from the Hall effect sensor and determine a level of a fluid corresponding to the axial position of the Hall effect sensor along the range of axial travel; and
   a heater operably connected to the controller, wherein
   the controller is programmed to enter a cook mode when the signal is within a threshold normal range corresponding to a normal operating range of the level of fluid, the cook mode allowing activation of the heater,
   the controller is programmed to enter an overfill mode when the signal is above the threshold nominal range corresponding to the level of fluid above the normal operating range, the overfill mode preventing, activation of the heater, and
   the controller is programmed to enter a low-fill mode when the signal is below the threshold nominal rant corresponding to the level of fluid below the normal operating range, the low-fill mode preventing activation of the heater.

2. The level sensing assembly of claim 1, further comprising a probe configured to be disposed within a fluid reservoir, the interior bore of the radially magnetized magnet sized to be slidingly received over an exterior surface of the probe.

3. The level sensing assembly of claim 2, wherein the Hall effect sensor is disposed within a hollow interior cavity of the probe.

4. The level sensing assembly of claim 1, wherein the float body defines a sealed interior volume, the assembly further comprising a pair of retainers disposed within the sealed interior volume and disposed at opposing axial ends of the magnet, the retainers supporting the magnet an axially centered position within the sealed interior volume of the float body.

5. The level sensing assembly of claim 4, wherein:
the float body comprises an upper float portion, a lower float portion and a center tube all sealingly joined to one another to form the sealed interior volume.

6. A steam cooker comprising:
a cabinet having a cooking chamber accessible through a door, the cabinet substantially sealed when the door is closed;
a reservoir in fluid communication with the cooking chamber; and
a level sensing assembly comprising:
a float body buoyant on a quantity of water, the float body positioned within the reservoir,
a radially magnetized magnet having an interior bore with a first magnet pole and an exterior surface radially opposite the interior bore, the exterior surface having a second magnet pole opposite the first magnet pole; and
a Hall effect sensor sized to be translated axially with respect to the radially magnetized magnet along a range of axial travel within the interior bore of the radially magnetized magnet to produce an output, the magnitude of the output varying substantially linearly with respect to a varying axial position of the Hall effect sensor along the range of axial travel; and
a controller programmed to receive the output from the Hall effect sensor and determine a level of a fluid corresponding to the axial position of the Hall effect sensor along the range of axial travel, the controller programmed to:
enter a cook mode when the signal is within a threshold nominal range corresponding to a normal operating range of the level of fluid,
enter an overfill mode when the signal is above the threshold nominal range corresponding to the level of fluid above the normal operating range, and
enter a low-fill mode when the signal is below the threshold nominal range corresponding to the level of fluid below the normal operating range; and
a heater operably connected to the controller, the controller programmed to allow activation of the heater when the controller is in the cook mode, and to prevent activation of the heater when the determined level of fluid is in the overfill mode or the low-fill mode.

7. The steam cooker of claim 1, further comprising:
a water inlet; and
a valve electrically coupled to the controller and operable to control a flow of water to the reservoir from the water inlet,
the controller programmed to open the valve when the controller is in the low-fill mode, and to close the valve when the controller is in the cook mode or the overfill mode.

8. A method of assessing the operational state of a fluid-interactive appliance, the method comprising:
receiving an analog signal from a Hall effect sensor disposed within an inner bore of a radially magnetized magnet, the magnitude of the analog signal varying substantially linearly with respect to a varying axial position of the Hall effect sensor along a range of axial travel within the inner bore of the radially magnetized magnet, the radially magnetized magnet fixed to a float that is buoyant on a fluid in a reservoir,
processing the analog signal to determine the axial position of the radially magnetized magnet and the float relative to the Hall effect sensor,
determining a level of a fluid within the reservoir from the axial position of the float as a function of the substantially linear analog signal, wherein:
enabling heater operable to boil water in the reservoir if the step of determining comprises determining the fluid contained in the reservoir is within a threshold fill level range, and
disabling the heater if the step of determine comprises determining the fluid contained in the reservoir is either above or below the threshold fill level range.

9. The method of claim 8, further comprising:
if the step of determining comprises determining that the fluid contained in the reservoir is above the threshold fill level range;
taking a corrective action including at least one of closing a water valve operable to discharge water to the reservoir, displaying a signal indicative of the fluid level above the maximum threshold, and activating an alarm.

10. The method of claim 8, further comprising:
if the step of determining comprises determining that the fluid contained in the reservoir is below the threshold fill level range;
taking a corrective action including at least one of opening a water valve operable to discharge water to the reservoir, displaying a signal indicative of the fluid level below the minimum threshold, and activating an alarm.

11. The method of claim 8, further comprising determining whether the fluid in the reservoir is boiling by monitoring for amplitude variation of the analog signal, wherein boiling is indicated by a larger variation in signal amplitude as compared to a non-boiling baseline amplitude variation.

12. The method of claim 11, further comprising detecting a rate of water loss from the reservoir during boiling by computing an average level of the signal over a time frame including a plurality of variations of the analog signal, and calculating a downward slope of the average level over the time frame, wherein a downward slope between 0.01 V per minute and 0.05 V per minute is the detected rate of water loss.

13. The method of claim 11, further comprising verifying whether a fill operation is operable during a boiling operational state by:
opening a water valve operable to discharge water to the reservoir,
comparing an amplitude of the analog signal before the opening of the water valve and after the opening of the water valve, wherein the operation of the fill operation is verified by a reduction in the amplitude indicative of a transition from the boiling operational state to a non-boiling operational state.

14. The method of claim 8, further comprising verifying whether a fill operation is operable during a non-boiling operational state by:

opening a water valve operable to discharge water to the reservoir, comparing a nominal value of the analog signal before the opening of the water valve and after the opening of the water valve, wherein the operation of the fill operation is verified by an increase in the nominal value of the analog signal indicative of a rising fluid level in the reservoir.

15. The method of claim 14, further comprising determining that the float is stuck in an axial position or the fill operation is not operable when the nominal value of the analog signal does not change for at least a predetermined time after the opening of the water valve.

16. The method of claim 8, further comprising determining a frictional interaction between the float and a probe upon which the float is slideably connected, by:

comparing a rate of change of the analog signal during a movement of the float to a baseline rate of change during a corresponding movement;

determining that the float is encountering static friction indicative of sticking or binding to the probe when the rate of change exceeds the baseline rate of change by at least 25%; and taking a corrective action including at least one of displaying a signal indicative of the frictional interaction and activating an alarm.

17. The method of claim 8, further comprising determining the float is stuck in an axial position by:

receiving a signal from a temperature sensor indicative of a temperature within a cooking chamber of the appliance, recording an amplitude of the analog signal when the temperature in the cooking chamber is at least 210 F for a monitored period having a duration of at least 3 minutes, comparing the amplitude of the analog signal during the monitored period with a minimum amplitude threshold indicative of float movement;

determining that the float is stuck when the amplitude of the analog signal fails to reach the minimum amplitude threshold.

18. The method of claim 8, further comprising detecting a leaking water valve by:

closing a water valve operable to discharge water to the reservoir, comparing a nominal value of the analog signal at a first time after the closing of the water valve and at a second time at least 10 seconds after the closing of the water valve and after the first time, wherein the water valve is determined to be leaking when the analog signal increases by at least 0.3V at the second time as compared to the first time; and taking a corrective action including at least one of displaying a signal indicative of the leaking water valve and activating an alarm.

19. The method of claim 8, further comprising entering a marine mode by:

comparing an amplitude of the analog signal to a threshold indicative of a rocking ship at sea; and initiating the marine mode if the analog signal exceeds the threshold for a period of at least 15 seconds, the marine mode including at least one of:

indicating a marine mode operational state on a display;

averaging the analog signal over a 20-second time window and processing the averaged analog signal to determine the axial position of the radially magnetized magnet and the float relative to the Hall effect sensor;

determining that the fluid contained in the reservoir is above a maximum threshold fill level and taking a corrective action after at least 8 seconds above the maximum threshold fill level; and opening a water valve to allow water to flow into the reservoir for a fill period followed by closing the water valve to prevent water from flowing into the reservoir for a delay period, then repeating the open and close procedures until the fluid contained in the reservoir is at or above a desired level for an entire delay period.

\* \* \* \* \*